United States Patent Office 3,418,387
Patented Dec. 24, 1968

3,418,387
PROCESS FOR THE PRODUCTION OF
ADAMANTANE
Slavoj Hala, Stanislav Landa, and Zdenek Weidenhoffer, Prague, Czechoslovakia, assignors to Ceskoslovenska Akademie Ved, Prague, Czechoslovakia
No Drawing. Filed Dec. 28, 1966, Ser. No. 605,232
Claims priority, application Czechoslovakia, Dec. 28, 1965, 7,790/65
8 Claims. (Cl. 260—666)

ABSTRACT OF THE DISCLOSURE

Process for the production of adamantane by dealkylation of mono- or polyalkyladamantanes at elevated temperatures in the presence of hydrogen and catalysts.

---

The present invention relates to a process for the production of adamantane by dealkylation of alkyladamantanes.

The hydrocarbon adamantane, tricyclo-$(3,3,1^{3,7})$-decane, occurs in minute amounts in some petroleum fractions. It has been prepared synthetically by treating endotetrahydrodicyclopentadiene with Lewis acids (Friedel-Krafts catalysts), such as $AlCl_3 \cdot HCl$ or $BF_3 \cdot HCl$. The yields of this known process are relatively low amounting to 10–40% generally about 20% based on the starting hydrocarbon (U.S. Patent 2,937,211, P. Schleyer, et al.; Org. Synth., 42, 8 (1963), or H. Koch, J. Franken: Brennstoff-Chem. 42, 90 (1961)). The yields obtained depend on the catalyst used as well as on the reaction conditions, especially the temperature and pressure. If $AlCl_3$ or $AlBr_3$ is used as isomerization catalysts, the isolation of adamantane from the reaction mixture is hampered by the presence of substantial amounts of tarry substances which are formed during the isomerization.

It has been proposed to prepare mono- and poly-alkyladamantane derivatives in high yields of from 85–100% (P. Schleyer and R. D. Nicholas: Tetra. Letters 9, 305 (1961), or H. Koch and J. Franken: Ber. 96, 213 (1963)) by analogous isomerization of some alkyl derivatives of tetrahydrodicyclopentadiene, as, for instance, methyltetrahydrodicyclopentadiene, or of similar saturated tricyclic hydrocarbons having the corresponding number of carbon atoms, e.g., exotetramethylene norbornate.

The alkyl derivatives of adamantane can also be obtained by isomerization of perhydroacenaphthene, perhydrophenanthrene or perhydroanthracene, and generally from polycyclic aromatic hydrocarbons having three rings which are completely hydrogenated and having at least 12 carbon atoms (U.S. Patent 3,128,316). Isomerization of such hydrocarbons by treatment with Lewis acids proceeds readily even at $-5°$ C. to $+50°$ C. and results in high yields of polymethyladamantanes. Thus, for example, the yield of 1,3-dimethyladamantane, which is formed by isomerization of perhydroacenaphthene, is practically quantitative.

The alkyl derivatives of adamantane are not as valuable as is the unsubstituted adamantane itself which possesses exceptional physical and chemical properties. It can be used as intermediate for various purposes. Its derivatives are biologically active and can be used for the production of valuable drugs and insecticides, as well as in the production of various plastics. Up to now, however, an economical process for the production of unsubstituted adamantane has not been available.

It is an object of the present invention to provide a process for the production of adamantane which is simple and economically feasible.

It is another object of the present invention to provide a process for the production of adamantane which uses readily available starting materials.

It is still another object of the present invention to provide a process for the production of adamantane which can be carried out with the formation of only negligible amounts of by-products.

It is a further object of the present invention to provide a process for the production of adamantane which can be carried out continuously.

Other objects will become apparent as the description proceeds.

It has now been found in accordance with the present invention that adamantane can be produced in almost theoretical yields by heating a mono- or poly-alkyladamantane to a temperature of about 250–800° C. in the presence of hydrogen or a substance which yields hydrogen under the conditions of the process. Preferably the heating is carried out in the presence of a hydrogenating catalyst, thereby dealkylating said alkyladamantane. Under the conditions of the process of the invention, undesirable side reactions giving rise to tarry products and the detruction of the adamantane skeleton are reduced to a minimum. The procedure of the invention has the additional advantage that it can be carried out continuously, e.g., by using a continuous-flow apparatus.

For the dealkylation, e.g., the readily available 1,3-dimethyladamantane can be used. In a trial run the reaction was carried out over a nickel catalyst containing 8.5% $Al_2O_3$. The reaction products were analyzed over the entire temperature range from 250 to 800° C. Methyl groups were split off over the entire temperature range. Between 250 and 300° C., the demethylation was slow, the main demethylation product being monomethyladamantane. With increasing temperatures, the second methyl group began to be split off more rapidly and the reaction product thus contained more adamantane at temperatures above 300° C. Above 400° C., adamantane was the main reaction product. The demethylation was accompanied by a side reaction, the decomposition of the adamantane skeleton which started at a temperature of above 500° C., thereby effecting the yield of adamantane. The preferred temperature range for the process of the invention is therefore between about 300 and 500° C.

In another run the dependence of the dealkylation on the catalyst was determined, using an $Ni/Al_2O_3$ catalyst. The reaction was performed with a series of catalysts containing 5, 15, 31, 32, 37, 44, 48, 52, 91 and 97% nickel at a temperature of 410° C. The highest conversion was obtained with catalysts containing 30–50% Ni, the conversion of 1,3-dimethyladamantane to adamantane passing a maximum. The pure adamantane can be readily isolated from the crude reaction product by recrystallization from conventional solvents. Methyladamantane or other alkyladamantanes remaining after the separation of the adamantane from the crude product can be recycled into the process.

As catalyst, generally such activating materials can be used, which promote hydrogenation, thus shifting the reaction temperature to lower ranges, whereby said conditions can be maintained wherein the dealkylation still proceeds completely and rapidly without however the occurrence of undesirable side reactions. A highly active catalyst can be produced by reducing a mixture of oxides or hydroxides of nickel and aluminum with hydrogen at elevated temperatures e.g., 300–400° C. preferably 350° C., thereby obtaining elementary Ni $Al_2O_3$ catalysts. Preferably the Ni-content in such catalysts is in the range of 30–50% by weight. In addition to the Ni-alumina catalysts, other catalysts have been found effective in the dealkylation process of alkyl-adamantane, such as the metals of the Groups VI and VIII of the Periodic System, Co, Mo, and W. As carriers in addition to alumina, other supporting materials which provide a large surface area at the reaction temperatures can be used, such as precipitated silica, aluminum-silicates, certain natural or synthetic zeolites, bentonites, kieselguhr and the like. The term mono- or poly-alkyladamantanes as used herein contemplates generally lower alkyl-substituted adamantanes, preferably mono- or poly-, methyl- or ethyl-adamantanes, such as, 1-methyladamantane; 1-ethyladamantane; 1,3-dimethyladamantane; 1,3 - dimethyl-5-ethyl-adamantane, 1,3,5,7-tetramethyladamantane; 1,3-dimethyl - 5 - ethyladamantane, and the like.

The dealkylation can be carried out at normal pressures, as well as at super-atmospheric pressures, such as from 2–50 atm. gauge. The hydrogen is applied in a molar excess based on the alkyladamantane used. Generally, a molar ratio of alkyladamantane/hydrogen in the range of 1–3 to 1–15 is appropriate. Advantageously, a molar ratio of between 1:5 and 1:10 is used, whereby a ratio of about 1:7 is preferred. Instead of hydrogen, hydrogen generating substances such as water and the like can be used.

The process of the invention is illustrated by the following examples: In carrying out the processes of the examples, a continuous-flow apparatus provided with a solid catalyst bed was used. The percent values in the examples are by weight. The composition of the reaction products was analyzed by gas-chromatography.

Example 1

A mixture of vapors of 1,3-dimethyladamantane and hydrogen at a molar ratio of 1:7 was conducted under atmospheric pressure, at a volume rate of 1.32 mol 1,3-dimethyladamantane/$h$ kg. catalyst at 417° C. over a solid nickel catalyst containing 37% Ni and 62.8% $Al_2O_3$ and produced the following reaction product: 79.5% adamantane, 19.7% 1-methyladamantane and 0.8% non-reacted 1,3-dimethyladamantane. The crude reaction product was dissolved in four weight parts of boiling tetrachloromethane. After cooling the solution to 20° C., pure adamantane having a melting point of 269° C. crystallized from the solution. By concentrating the mother liquor the remaining adamantane of about 95% purity (M.P. 265° C.) was obtained.

Example 2

The procedure described in Example 1 was followed except that an industrial contact catalyst was used, which contained 48% Ni and 52% $Al_2O_3$. The volume rate of 1,3-dimethyladamantane was 3.1 mol/$h$ kg. catalyst. At 410° C., the reaction product contained 52.6% adamantane, 39.6% 1-methyladamantane and 4.2% 1,3-dimethyladamantane.

Example 3

The procedure of Example 1 was followed with the exception that 1-methyl-adamantane was used as the compound to be dealkylated at 380° C. The reaction product contained 72% adamantane and 28% 1-methyladamantane.

Example 4

The procedure according to Example 1 was followed except that 1-ethyladamantane was used as starting material. The reaction product contained 81.2% adamantane and 18.8% 1-methyladamantane.

Example 5

1,3-dimethyl-5-ethyladamantane was dealkylated using the catalyst of Example 1. At 450° C., the molar ratio of alkyladamantane to hydrogen was 1:7 and its volume rate was 0.42 mol/$h$ kg. catalyst. The reaction product contained 76.5% adamantane, 22.5% 1-methyladamantane and 0.9% 1,3-dimethyladamantane.

Example 6

The procedure of Example 5 was followed except that 1,3,5,7-tetramethyladamantane served as the starting material. The reaction product contained 66.5% adamantane, 24.1% 1-methyladamantane, 8.2% 1,3-dimethyladamantane and 1.2% 1,3,5-trimethyladamantane.

Example 7

The procedure described in Example 1 was followed with the exception that the dealkylation was carried out at a pressure of 25 atm. The reaction product contained 82.4% adamantane and 17.6% 1-methyladamantane.

EXAMPLE 8

A mixture of gaseous 1,3-dimethyladamantane and hydrogen at a molar ratio of 1:7 was conducted at atmospheric pressure, at a volume of 1.29 mol 1,3-dimethyladamantane/$h$ kg. catalyst at 720° C. over a solid chromium catalyst containing 24.8% $Cr_2O_3$ and 75.0% $Al_2O_3$ and yielded the following reaction product: 60.8% adamantane, 36.2% 1-methyladamantane and 3% 1,3-dimethyladamantane.

What is claimed is as follows:

1. Method of preparing adamantane which comprises reacting a member selected from the group consisting of mono- and poly-alkyl derivatives of adamantane containing one to four carbon atoms in the alkyl groups thereof with hydrogen at a temperature of from 250–800° C. in presence of a dealkylating catalyst selected from the group consisting of Group VI and VII metals and their oxides supported on a solid carrier and recovering the adamantane thereby formed.

2. Method according to claim 1 which comprises conducting said reaction at an elevated pressure.

3. Method according to claim 2 which comprises conducting said reaction at a pressure of 0.1–300 atmospheres.

4. Method according to claim 1 wherein said hydrogen is formed in situ.

5. Method according to claim 1 wherein said catalyst is an Ni-alumina catalyst containing 30–50% Ni.

6. Method according to claim 1 wherein said catalyst is a chromium sesquioxide alumina catalyst containing 10–40% chromium sesquioxide.

7. Method according to claim 1 wherein said adamantane derivative is a member selected from the group consisting of 1,3-dimethyladamantane, 1-methyladamantane, 1-ethyladamantane, 1,3-dimethyl-5-ethyladamantane and 1,3,5,7-tetramethyladamantane.

8. Method according to claim 1, wherein said molar ratio of adamantane derivative to hydrogen is from 1:3 to 1:15.

References Cited

UNITED STATES PATENTS 2,422,671   6/1947   Haensel et al. _____ 260—666
2,422,674   6/1947   Haensel et al. _____ 260—666

DELBERT E. GANTZ, *Primary Examiner.*

V. O'KEEFE, *Assistant Examiner.*